US008413265B1

(12) United States Patent
Hoppes

(10) Patent No.: US 8,413,265 B1
(45) Date of Patent: Apr. 9, 2013

(54) GLOVE WITH RETRACTABLE ICE PICK

(76) Inventor: Gerald L. Hoppes, Chase, MI (US)

( * ) Notice: Subject to any disclaimer, the term of this patent is extended or adjusted under 35 U.S.C. 154(b) by 550 days.

(21) Appl. No.: 12/316,935

(22) Filed: Dec. 18, 2008

(51) Int. Cl.
*A63B 71/14* (2006.01)
(52) U.S. Cl.
USPC .................. 2/161.5; 2/160; 2/161.1; 2/161.6
(58) Field of Classification Search .................. 401/113; 2/160, 161.6, 161.1, 161.5
See application file for complete search history.

(56) References Cited

U.S. PATENT DOCUMENTS

| | | | |
|---|---|---|---|
| 1,192,160 A | 7/1916 | Boice | |
| 1,217,905 A | 3/1917 | Boice | |
| 1,346,894 A | 7/1920 | Jacobs | |
| 2,201,117 A * | 5/1940 | Wild | 401/62 |
| 2,294,997 A * | 9/1942 | Merrion | 2/160 |
| 2,805,883 A | 9/1957 | Sauvago | |
| 3,981,526 A | 9/1976 | Lundqvist | |
| 4,002,366 A | 1/1977 | Hammes | |
| 4,020,551 A | 5/1977 | Lindqvist | |
| 4,447,912 A * | 5/1984 | Morrow | 2/159 |
| 4,625,339 A * | 12/1986 | Peters | 2/160 |
| 4,683,592 A * | 8/1987 | Strongwater | 2/17 |
| 4,815,997 A | 3/1989 | Forsmark et al. | |
| 5,088,121 A * | 2/1992 | Wallace | 2/160 |
| 5,209,685 A | 5/1993 | Hammes | |
| 5,310,229 A | 5/1994 | Hanson | |
| 5,325,596 A | 7/1994 | Baker | |
| D356,657 S | 3/1995 | Hauswald | |
| 5,423,843 A * | 6/1995 | Werner | 606/167 |
| 5,924,752 A | 7/1999 | Moody | |
| 6,223,441 B1 * | 5/2001 | Parsons | 30/367 |
| 6,244,639 B1 | 6/2001 | Storck | |
| 6,276,855 B1 * | 8/2001 | Hsien | 401/114 |
| 6,397,394 B1 * | 6/2002 | Hambly | 2/160 |
| 6,550,068 B1 * | 4/2003 | Materon | 2/160 |
| 6,553,574 B1 * | 4/2003 | Hall et al. | 2/160 |
| 2005/0228421 A1 * | 10/2005 | Bilenski et al. | 606/167 |

* cited by examiner

*Primary Examiner* — Katherine Moran
*Assistant Examiner* — Sally Haden
(74) *Attorney, Agent, or Firm* — Montgomery Patent & Design, LLC; Robert C. Montgomery

(57) ABSTRACT

A glove comprising integrated features specifically designed for use while ice fishing is herein disclosed. An outer covering comprises a durable material of construction, such as leather, that stands up to the rigors of ice fishing and is also coated with a flexible plastic coating to help keep a user's hands dry. The glove is lined for warmth. A finger tip region of the glove is left open to allow the passage of a user's digits, thereby allowing dexterity when tying lures or handling fishing line. A palm region comprises an integral and retractable ice pick, which extends outward from the side of the palm, opposite the thumb, and is automatically gripped when the user closes their hand and makes a fist. The pick is extended by a spring-loaded mechanism that the user locks in place for safety. As such, the ice pick can be used to safely pick through any ice at a fishing hole or be used for similar ice-related tasks.

5 Claims, 3 Drawing Sheets

GLOVE WITH RETRACTABLE ICE PICK

RELATED APPLICATIONS

The present invention was first described in a notarized Official Record of Invention on Dec. 13, 2007, that is on file at the offices of Montgomery Patent and Design, LLC, the entire disclosures of which are incorporated herein by reference.

FIELD OF THE INVENTION

The present invention relates generally to a glove comprising integrated features specifically designed for use while ice fishing and, more particularly, to said glove comprising an outer covering coated with a flexible plastic to help keep a user's hands dry and an integral and retractable ice pick which extends outward from the side of the palm, opposite the thumb, enabling it to be easily gripped when a user closes their hand and makes a fist.

BACKGROUND OF THE INVENTION

One particular type of fishing that has gained popularity in recent times is that of ice fishing. Ice fishing along with general fishing in colder weather is great fun due to the different nature of the fish actions and other environmental differences. Of course, one must deal with the cold when ice fishing. Gloves can be worn, but they get wet, and require constant removal to deal with intricate tasks such as tying, luring, or dealing with tangled fishing lines. Another common tool used while ice fishing is that of the ice pick. However, it is prone to becoming easily lost and its small size makes it easy to drop, especially in gloved hands. Accordingly, there exists a need for a means by which gloves can be adapted for the specific duties of ice fishing to address the deficiencies as listed above. The development of the device herein described fulfills this need.

All too often in areas of the country where ice accumulates in the wintertime have tragic stories of people who have fallen through the ice and succumbed. Many of these deaths are related to popular outdoor activities such as snowmobiling, ice fishing and skating. These deaths can be averted if an individual who has fallen through the ice can gain traction in order to pull themselves from the water before suffering hypothermia. By incorporating a retractable ice pick in a glove, one could obtain purchase on unbroken ice and leave the icy water before exposure renders muscles inert and non-responsive.

There have been attempts in the past to invent devices that improve on an ice pick's functionality. U.S. Pat. No. 6,244,639 issued Storck discloses an ice gripping device with hand and wrist straps that appears to comprise a strap with a gripping means. Unfortunately, this patent does not appear to disclose a glove with a retractable ice pick.

U.S. Pat. No. 5,924,752 issued to Moody discloses an ice spike that appears to comprise a spike mounted to a body that is attachable to the forearm of a user. Unfortunately, this patent does not appear to disclose a glove with a retractable ice pick comprising a housing with a spring loaded ice pick contained therein.

U.S. Pat. No. D 356,657 issued to Hauswald discloses a glove with slots on the rear surface for carrying golf tees. Unfortunately, this design patent does not appear to be similar to the disclosed device, nor does this patent appear to disclose a glove with an attached ice pick.

U.S. Pat. No. 5,325,596 issued to Baker discloses a self defense glove that appears to comprise a glove like structure that contains a plurality of knife blades that are retractable at the fingertips. Unfortunately, this patent does not appear to disclose a warm glove for wintertime activities that comprises an attached integral ice pick.

U.S. Pat. Nos. 5,310,229 issued to Hanson and 5,209,685 disclose ice emergency aids and recovery methods that appears to comprise a structure that can be gripped that further comprise integral ice picks. Unfortunately, these patents do not appear to disclose a glove with a retractable ice pick.

U.S. Pat. No. 4,020,551 issued to Lindquist discloses a pair of ice picks and a whistle that are mounted to a wearable strap. Unfortunately, this patent does not appear to disclose a glove with a retractable ice pick comprising a housing with a spring-loaded ice pick contained therein.

U.S. Pat. No. 3,981,526 issued to Lundquist discloses a spike tool that is mounted on a holder that may be strapped around a user's palm. Unfortunately, this patent does not disclose a glove with a retractable ice pick located in a position to be grasped by a user.

U.S. Pat. No. 1,346,894 issued to Jacobs discloses a device for husking, snapping, and shucking corn that appears to comprise a holder that can be strapped about a user's palm. Unfortunately, this patent does not appear to disclose a glove with a retractable ice pick comprising a housing with a spring-loaded ice pick contained therein.

U.S. Pat. Nos. 1,192,160 and 1,217,905, both issued to Boice, disclose different corn husking devices that appear to be pointed devices mounted to holders that can be attached to a user's hand. Unfortunately, these patents do not appear to disclose a retractable ice pick that is attached to a glove that further comprises a lid to maintain the ice pick in a closed state.

None of the prior art particularly describes a glove with a retractable ice pick with an outer covering coated with a waterproof material that the instant device possesses. Accordingly, there exists a need for a means by which gloves can be adapted for the specific duties of ice fishing that operates without the disadvantages as described above.

SUMMARY OF THE INVENTION

In light of the disadvantages as previously discussed in the prior art, it is apparent that there is a need for a glove with an integral ice pick mounted on the palm surface of the glove which provides a means and method to assist in wintertime activities, such as ice fishing and snowmobiling.

An object of the glove with retractable ice pick is to provide a spring-loaded ice pick in a convenient location for outdoor wintertime activities and emergency situations.

Another object of the glove with retractable ice pick is to provide warmth and comfort to the user as well as increased manual dexterity.

A further object of the glove with retractable ice pick eliminates the need to remove a user's gloves in order to perform various wintertime activities.

Still another object of the glove with retractable ice pick provides such a glove provided in many styles such as open finger, mittens and the like.

Yet another object of the glove with retractable ice pick is a glove interior further comprising a textile or synthetic fabric liner to enhance warmth and may be comprised of one (1) or more of the following: fur, cloth, quilted linings, GORE-TEX® and the like.

Yet a further object of the glove with retractable ice pick provides an ice pick and ice pick housing manufactured of lightweight sturdy materials such as aluminum.

Another object of the glove with retractable ice pick provides a lid that prevents accidental inadvertent deployment of the ice pick from the ice pick housing.

Still a further object of the glove with retractable ice pick provides an ice pick housing and ice pick of any length.

An aspect of the glove with retractable ice pick comprises a glove, an ice pick housing and an ice pick.

Another aspect of the glove with retractable ice pick comprises a glove fashioned in the conventional manner and further comprising a non-slip finish that is applied to the palm portion of the glove and the finger areas to aid in grasping an object. The exterior surface of the glove may be coated with a rubber or plastic material in order to waterproof the glove. The glove further comprises exposed fingertips areas on the thumb, first and second fingers to provide increased manual dexterity and eliminate the need to remove the glove when perform various manual tasks.

Still another aspect of the glove with retractable ice pick comprises an ice pick housing that is attached to the glove and comprises a hollow cylinder comprising a sealed base and an opening. The base of the ice pick housing is situated in the area of the palmar crease and extends outward in such a manner as to permit a user to grasp the ice pick housing. Situated on the top surface of the ice pick housing are a forward pin hole and a rear pin hole that receivably accept a pin located on the ice pick. The ice pick housing further comprises a base upon which a spring rests.

Still a further aspect of the glove with retractable ice pick is an ice pick comprising an ice pick and an ice pick body with a pin. The ice pick is housed within the ice pick housing that is retractable via a spring-loaded ice pick deployment mechanism.

Yet another aspect of the glove with retractable ice pick comprises an ice pick body further comprising a pair of pin guide rails that are attached to the inner surface of the ice pick housing and positioned on both sides of the rear pin hole and forward pin hole in a longitudinal manner to guide the pin while it moves between the two (2) pin holes. The ice pick body abuts against and compresses said spring and acts to store dynamic energy within the spring for use in deploying the ice pick from the ice pick housing.

Yet a further aspect of the glove with retractable ice pick comprises an ice pick housing further comprising a lid that covers the pin and the rear pin hole while the pin is contained within the rear pin hole. The lid attaches to the outer surface of the ice pick housing by means of a hinge.

A method of utilizing the glove with retractable ice pick may be achieved by performing the following steps: placing the glove with retractable ice pick upon the proper hand, insuring that the lid is secure over the rear pin hole and pin upon the ice pick housing; using the glove in an expected manner; deploying the ice pick by lifting the lid; insuring that no objects are in the path of the ice pick when it is deployed; depressing the pin located in the rear pin hole until the pin clears the rear pin hole and enters the ice pick housing; observing the movement of the ice pick from a retracted position within the ice pick housing to a deployed position outside of the ice pick housing; insuring that the pin has advanced and is contained within the forward pin hole; grasping the ice pick housing and utilizing the device in a normal and expected manner; retracting the ice pick into the ice pick housing by placing the tip of the ice pick against a solid object; depressing the pin located in the forward pin hole until the pin clears the forward pin hole and enters the ice pick housing; applying firm pressure on the ice pick against said solid object by moving the ice pick back into the ice pick housing until the pin is seated in the rear pin hole; replacing the lid on the ice pick housing; and, enjoying the benefits and ease of use of the glove with retractable ice pick.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
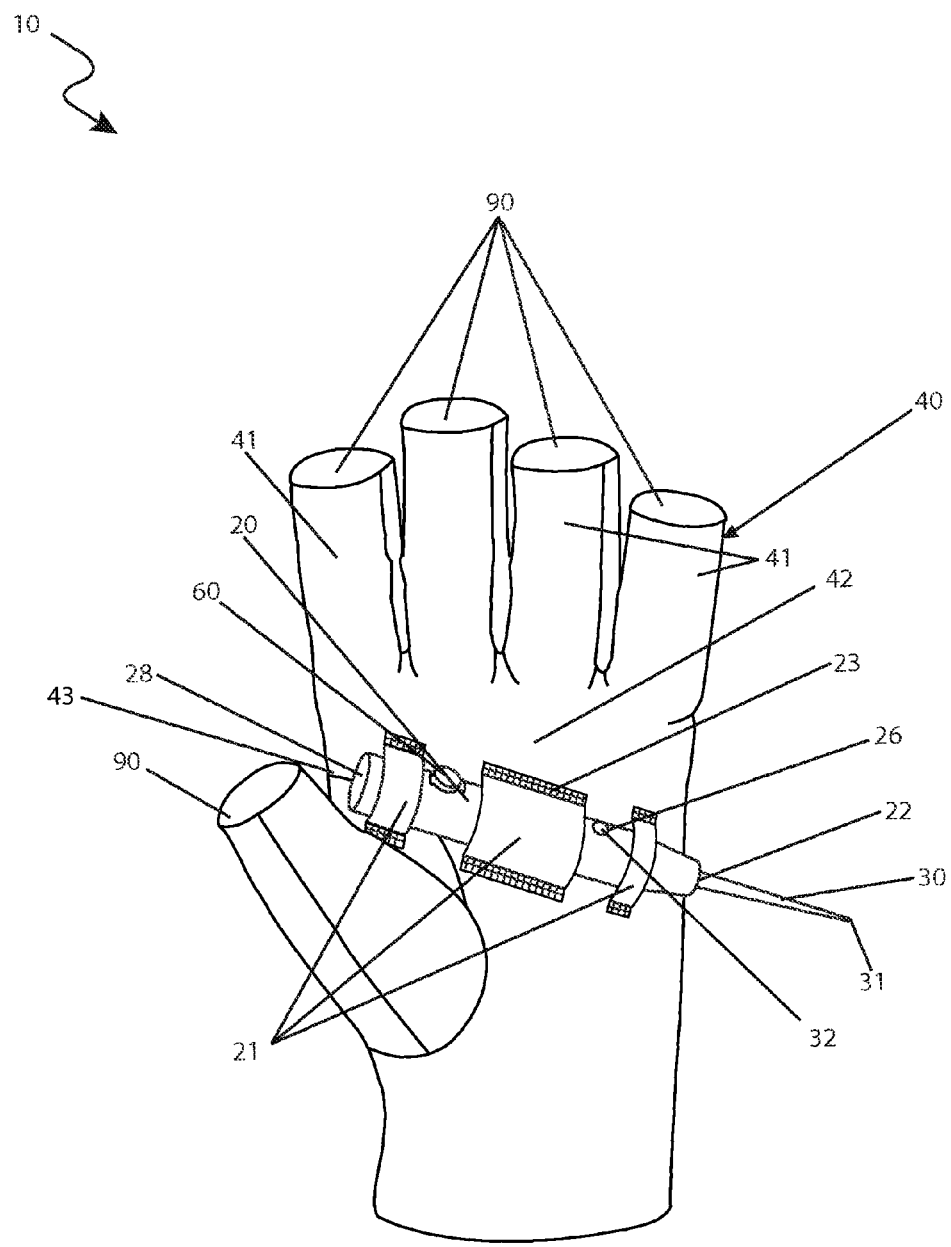
FIG. 1 is a top perspective view of the glove with retractable ice pick 10, according to a preferred embodiment of the present invention with the ice pick 30 deployed.

DESCRIPTIVE KEY 10 ice pick with retractable ice pick
20 ice pick housing
21 securing flaps
22 opening
23 stitching
24 rear pin hole
26 forward pin hole
27 hollow cylinder
28 base
30 ice pick
31 tip
32 pin
34 pin body
36 guide rail
40 glove
41 finger area
42 palmar portion of glove
43 palmar crease
50 spring
60 lid
62 hinge
70 ice pick deployment mechanism
80 forward motion
90 exposed finger area

DETAILED DESCRIPTION OF THE PREFERRED EMBODIMENT

Figure 2:
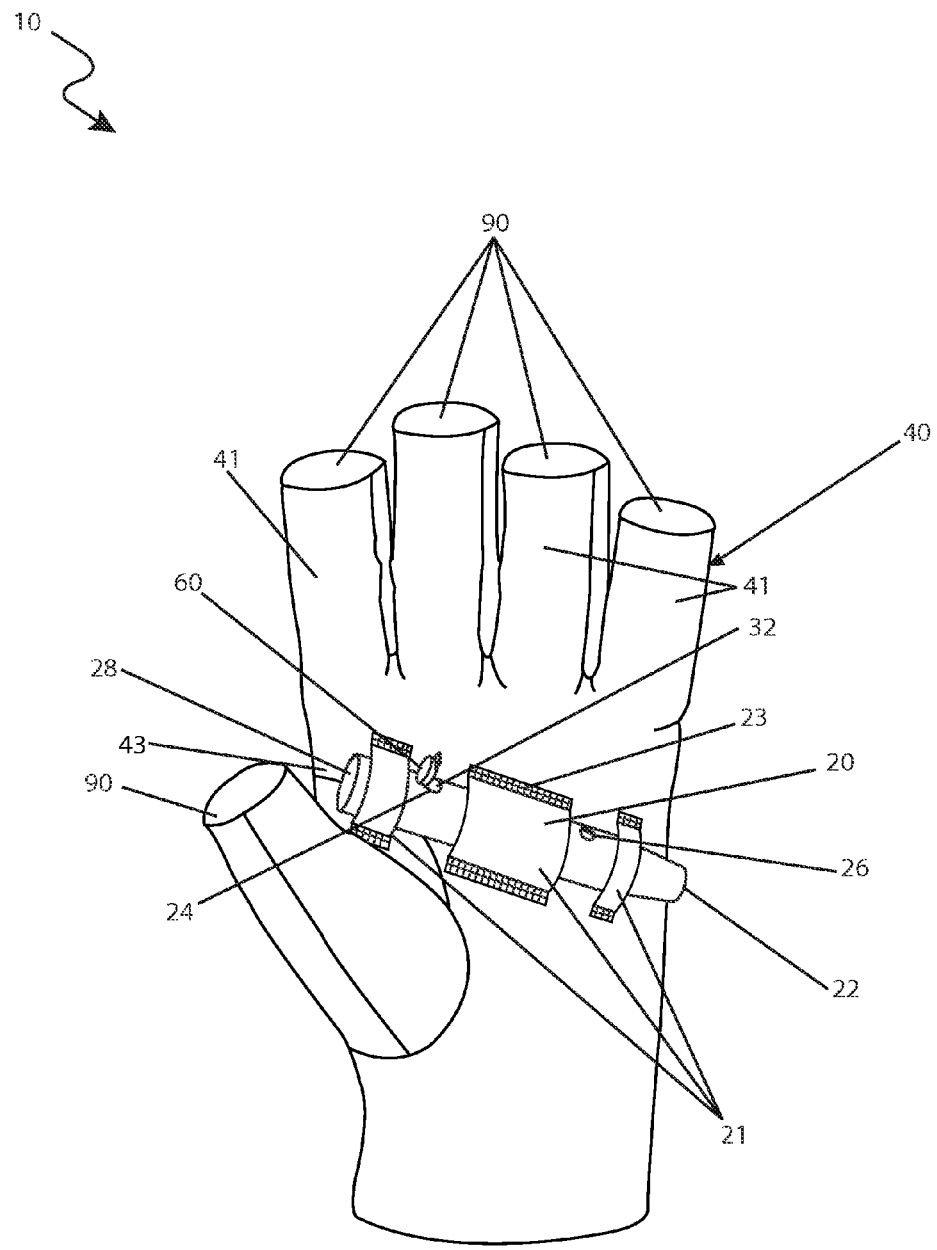
FIG. 2 is a top perspective view of the glove with retractable ice pick 10 with the ice pick 30 in a retracted position and contained within the ice pick housing 20; and, FIG. 3 is a sectional view of the ice pick housing 20 illustrating the ice pick deployment mechanism 70.
Figure 3:
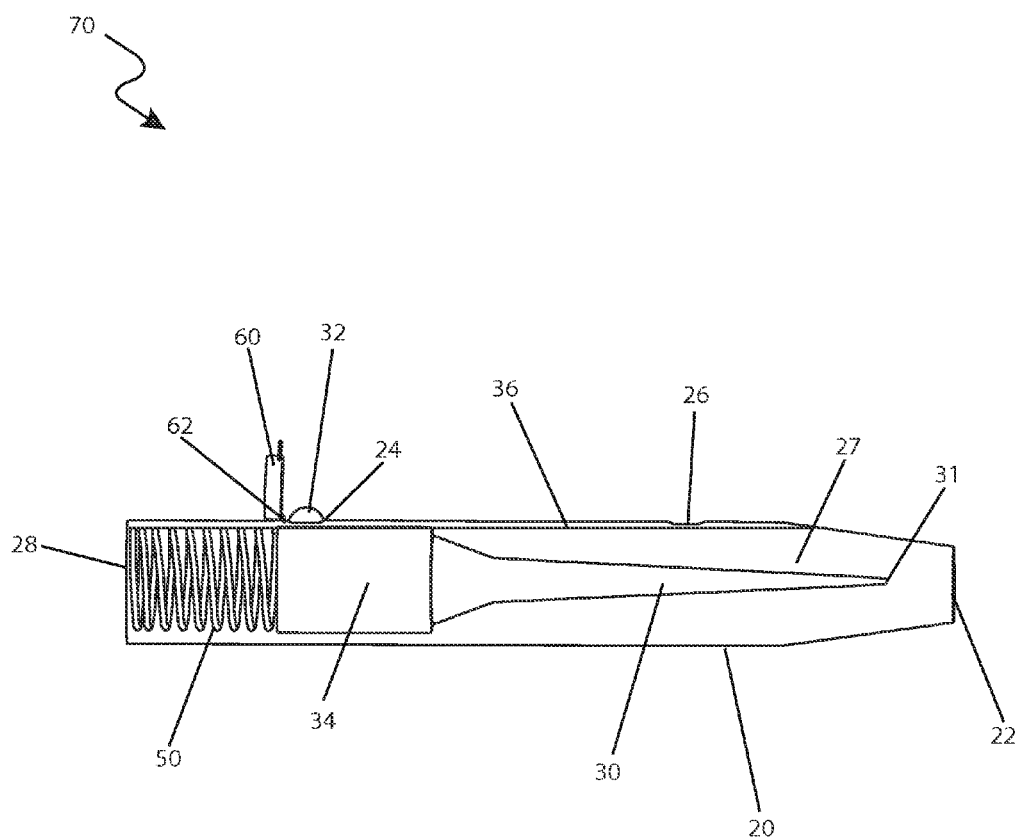

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a glove with an integral ice pick 10 mounted on the palm surface of the glove 42 (herein described as the "device") 10, which provides a means and method to assist in wintertime activities such as, ice fishing and snowmobiling. The device 10 is specifically adapted to provide warmth and comfort to the user and increased manual dexterity. Due to these characteristics, one does not need to remove their gloves in order to perform various activities. The device 10 is especially useful for use in ice-fishing but may be used in any manner of wintertime activities wherein its characteristics would prove useful.

Referring now to FIG. 1, a top perspective view of the device 10, according to the preferred embodiment of the present invention, is disclosed with the ice pick 30 depicted in the deployed position. The device 10 comprises a glove 40, an ice pick housing 20 and an ice pick 30. The glove 40 is fashioned in the conventional manner and is envisioned to be made of leather but may be made of any durable material. The glove 40 further comprises a non-slip finish that is applied to the palm portion of the glove 42 and the finger areas 41 to aid in grasping an object. The exterior surface of the glove 30 may be coated with a rubber or plastic material in order to waterproof the glove 30. The glove 40 further comprises exposed fingertips areas 90 on the thumb, first and second fingers thereto provide increased manual dexterity and eliminate the need to remove the glove 40 when perform various manual tasks. Although the preferred embodiment discloses a glove 40 with exposed finger areas 90, it is should be noted that other types of hand coverings such as mittens, full fingered gloves and the like may be utilized with equal effectiveness and as such should not be considered a limiting feature of the invention. The interior of the glove 30 further comprises a textile or synthetic fabric liner to enhance warmth and may be comprised of one (1) or more of the following: fur, cloth, quilted linings, GORE-TEX® and the like. The ice pick housing 20 is attached to the glove 30 by conventional attachment means including but not limited to: adhesives, sewing and the like. FIG. 1 shows the ice pick housing 20 attached to the glove using a plurality of securing flaps 21 attached thereto the glove 40 using a plurality of stitching 23. This embodiment is beneficial because the ice pick housing 20 is capable of being removably attached thereto the glove 40. The base 28 of the ice pick housing 20 is situated in the area of the palmar crease 43 between the thumb and the first finger and extends outward towards the outside curve of the glove 40 in such a manner as to permit one to grasp the ice pick housing 20 in a normal and expected manner. As illustrated here, when the ice pick 30 is deployed from the ice pick housing 20; the pin 32 is positioned in the forward pin hole 26. The ice pick 30 and ice pick housing 20 are envisioned to be manufactured of lightweight, sturdy materials such as aluminum, steel and the like but may be manufactured of any material capable of meeting the rigorous challenges of repetitive outdoor work in inclement weather.

Referring now to FIG. 2, a top view of the device 10, according to its preferred embodiment of the present invention is disclosed with the ice pick 30 retracted therewithin the ice pick housing 20. The device 10 further comprises an ice pick housing 20, an ice pick 30, a pin 32, a lid 60 and an ice pick deployment mechanism 70. The ice pick 30 is housed within the ice pick housing 20 and is retractable via a spring loaded ice pick deployment mechanism 70. The housing 20 comprises a hollow cylinder 27 possessing a sealed base 28 and an opening 22. Situated on the top surface of the ice pick housing 20 are a forward pin hole 26 and a rear pin hole 24 that receivably accept said pin 32 located thereon the ice pick 30. The ice pick 30 is approximately 2½ inches in length and extends when deployed approximately one-and-a-half (1½) inches from the glove 40 surface. It should be understood that the length of the ice pick housing 20 and ice pick 30 may be of any length and as such this should not be considered a limiting feature of the invention.

Referring now to FIG. 3, a sectional view of the ice pick housing 20 and ice pick 30. This figure illustrates the ice pick deployment mechanism 70. The ice pick 30 further comprises an ice pick 30 and an ice pick body 34 with a 32 pin. The ice pick housing 20 further comprises a base 28 upon which a spring 50 rests. The ice pick body 34 abuts thereagainst and compresses said spring 50 and acts to store dynamic energy within the spring 50 for use in deploying the ice pick 30 from the ice pick housing 20. The ice pick housing 20 further comprises a rear pin hole 24 and a forward pin hole 26 that slidably accept the ice pick pin. When in the retracted position, the ice pick body 34 compresses the spring 50 and the pin 32 slidably engages and rests therein the rear pin hole 24 in such a manner as to maintain retraction of the ice pick 30. The ice pick body 20 further comprises a pair of pin guide rails 36 that are attached to the inner surface of the ice pick housing 20 and are positioned on both sides of the rear pin hole 24 and forward pin hole 26 in a longitudinal manner to guide the pin 32 while it moves between the two pin holes 24, 26. The spring 50 comprises a common spring 50 of sufficient strength as to provide enough force to deploy the ice pick 30 from the ice pick housing 20. The ice pick housing 20 further comprises a lid 60 that covers the pin 32 and the rear pin hole 24 while the pin is contained within the rear pin hole 24. The lid 60 attaches thereto the outer surface of the ice pick housing 20 by means of a hinge 62. The lid 60 prevents accidental inadvertent deployment of the ice pick 30 from the ice pick housing 20. To deploy the ice pick 30, one would lift the lid 60, press down on the pin 32 until the pin 32 clears the rear pin hole 24 and observe the forward motion 80 of the ice pick 30 to the deployed position. To retract the ice pick 30, one would place the ice pick 30 against a firm surface and press down on the pin 32 contained therein the forward pin hole 26 until the pin 32 clears the forward pin hole 26 and apply steady pressure to move the ice pick 30 back into the ice pick housing 20 thereby compressing the spring 50 contained therein the ice pick housing 20. When the ice pick 30 is fully retracted the pin 32 will be visible in the rear pin hole 24.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: placing the glove with retractable ice pick 10 upon the proper hand, insuring that the lid 60 is secure over the rear pin hole 24 and pin 32 upon the ice pick housing 20; using the glove 30 in an expected manner; deploying the ice pick 30 by lifting the lid 60; insuring that no objects are in the path of the ice pick 30 when it is deployed; depressing the pin 32 located in the rear pin hole 24 until the pin 32 clears the rear pin hole 24 and enters the ice pick housing 20; observing the movement of the ice pick 30 from a retracted position within the ice pick housing 20 to a deployed position outside of the ice pick housing 20; insuring that the pin 32 has advanced and is contained within the forward pin hole 26; grasping the ice pick housing 20 and utilizing the device 10 in a normal and expected manner; retracting the ice pick 30 into the ice pick housing 20 by placing the tip 31 of the ice pick 30 against a solid object; depressing the pin 32 located in the forward pin hole 26 until the pin 32 clears the forward pin hole 26 and enters the ice pick housing 20; applying firm pressure on the ice pick thereagainst said solid object thereby moving the ice pick 30 back into the ice pick housing 20 until the pin 32 locks is seated therein the rear pin hole 24; replacing the lid 60 on the ice pick housing 20; and, enjoying the benefits and ease of use of the glove with retractable ice pick 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A glove with retractable ice pick, comprising:
   a glove body comprising a palm side, and a plurality of finger areas adapted for wear on a human hand;
   an ice pick housing removably attached to said palm side of said glove body and positioned parallel to a palmar crease;
   three securing flaps affixed at opposing ends to said palm side of said glove body traversing said palmar crease to receive said ice pick housing;
   a rigid ice pick having an elongated shank and a tip disposed at an end of said shank suitable for chipping ice movably attached within a hollow interior of said ice pick housing;
   a spring disposed within said ice pick housing hollow interior for deploying said ice pick from a retracted position to a deployed position;
   a depressible pin disposed on a body of said ice pick opposite said tip;
   a rear pin hole disposed in said ice pick housing for receiving said pin to secure said ice pick in said retracted position;
   a forward pin hole disposed in said ice pick housing for receiving said pin to secure said ice pick in said deployed position; and
   a lid hingedly attached to an outer surface of said ice pick housing for covering said rear pin hole and said pin when said ice pick is in said retracted position;
   wherein said ice pick is in said retracted position when within said ice pick housing; and,
   wherein said ice pick is in said deployed position when outside said ice pick housing.

2. The glove of claim 1, wherein said glove is coated with a waterproof material.

3. The glove of claim 2, wherein said waterproof material comprises a rubber coating.

4. The glove of claim 2, wherein said waterproof material comprises a plastic coating.

5. The glove of claim 1, wherein said glove has exposed fingertip areas.

* * * * *